United States Patent [19]

Dayton et al.

[11] 4,254,435
[45] Mar. 3, 1981

[54] NOISE ELIMINATOR FOR TELEVISION SYNCHRONIZING SIGNAL SEPARATING CIRCUITS

[75] Inventors: Birney D. Dayton, Nevada City; William L. Rorden; Leon J. Stanger, both of Grass Valley, all of Calif.

[73] Assignee: The Grass Valley Group, Inc., Grass Valley, Calif.

[21] Appl. No.: 28,306

[22] Filed: Apr. 30, 1979

[51] Int. Cl.$^3$ .............................................. H04N 5/08
[52] U.S. Cl. ................................... 358/155; 358/153; 358/154
[58] Field of Search ........................ 358/155, 153, 154

[56] References Cited

U.S. PATENT DOCUMENTS

| | | | |
|---|---|---|---|
| 3,873,768 | 3/1975 | Klein | 358/155 |
| 3,903,365 | 9/1975 | Arai | 358/155 |
| 4,040,090 | 8/1977 | Haynes | 358/155 |

*Primary Examiner*—Richard Murray
*Attorney, Agent, or Firm*—William D. Haffner

[57] ABSTRACT

A circuit for reducing the effects of negative-going impulse noise in composite television video signals has on sync separators is disclosed. A variable output current source is used to supply rundown current to a dc restorer in a sync separator. A retriggerable monostable multivibrator is triggered by negative-going impulse spikes in the composite video signal. The output of this multivibrator is coupled to the current source to increase its output and therefore decrease the time required for the dc restorer to recover from the negative spike.

6 Claims, 2 Drawing Figures

NOISE ELIMINATOR FOR TELEVISION SYNCHRONIZING SIGNAL SEPARATING CIRCUITS

It is therefore an object of the present invention to provide a circuit for use in sync separator circuits to decrease the length of time required to recover from negative voltage spikes on the input composite video signal.

The foregoing and numerous other objects and advantages of the present invention will become apparent as the same is more fully understood from the following description and drawings which describe the preferred embodiment of the invention. It is to be understood, however, that this emobodiment is not intended to be exhausting nor limiting of the invention but is given for purposes of illustration.

DETAILED DESCRIPTION OF THE PREFERRED EMBODIMENT

Figure 1:
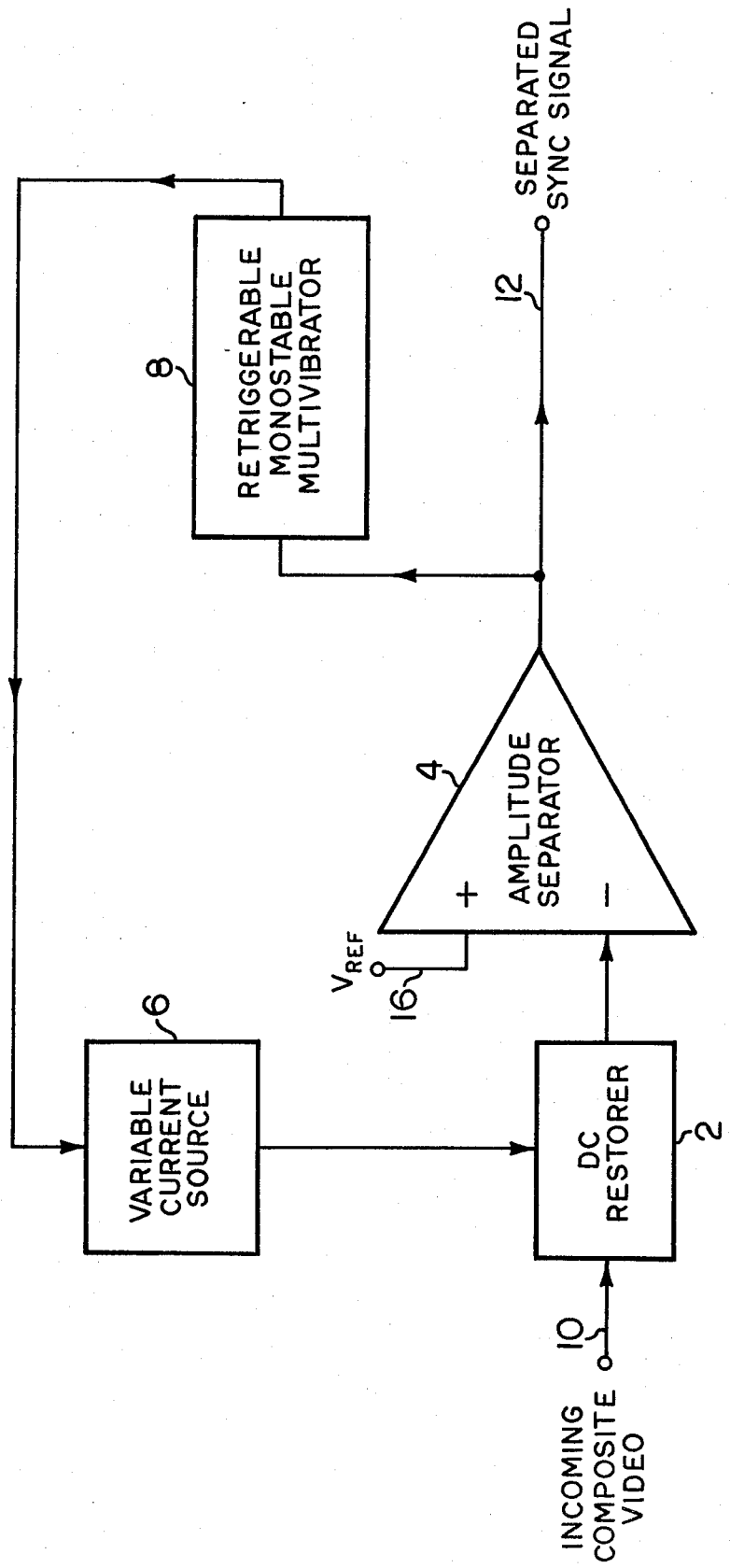
FIG. 1 is a block diagram of a sync separator according to the present invention.

Referring now to FIG. 1, therein is shown a block diagram of a sync separator circuit including the present invention.

The composite video signal enters the sync separator circuit on input line 10 and the separated sync signal exits the circuit on output line 12. The composite video signal is first coupled to dc restorer 2. The output of dc restorer 2 is one input to amplitude separator 4 the other input thereto is a reference voltage on line 16. The output of amplitude separator 4 is connected to output line 12 and also to monostable multivibrator 8 whose output terminal is connected to variable current source 6. Current source 6 supplies the current for the dc restoration function accomplished by dc restorer 2.

For accurate separation of the sync pulses from the incoming composite video signal, it must be dc restored, otherwise changes in the average picture level (APL) may cause the video signal to be clipped above the blanking level. DC restoration is performed by dc restorer 2 which may be of any conventional design. This dc restoration is accomplished by clamping the tip of the sync signal to a predetermined dc level, usually ground. The clamped video signal is coupled to amplitude separator 4 which may be of any conventional design. Amplitude separator 4 may be, for example, a comparator whose reference voltage on input line 16 is approximately equal to the 50-percent amplitude level of the clamped sync pulse. Thus, the comparator output will be only that portion of the dc-restored composite video signal between the 50-percent point and the tip of sync; thus, the video signal will be removed. Those desiring more detailed information concerning the operation of dc restorers, amplitude separators and sync separators in general are referred to the circuit concept book "Televison Waveform Processing Circuits", by G. A. Eastman, copyright 1968 by Tektronix, Inc. which is incorporated herein by reference.

When there is a sync pulse output from amplitude separator 4, monostable multivibrator 8 will stay in the triggered condition. If, however, a large negative voltage spike enters the cicruit and drives the output of dc restorer 2 below the operating threshold of amplitude separator 4, there will be no pulse output therefrom. When there is no pulse output from amplitude separator 4 for more than one horizontal line period, monostable multivibrator 8 will time out. The output from monostable multivibrator 8 is coupled to variable current source 6 and increases the current output thereof when monostable multivibrator 8 is timed out. This increased current will decrease the time required for the sync separator to recover from the missed sync pulse. As soon as the output of dc restorer 2 has recovered and the input signal is at the correct level to turn on amplitude separator 4, monostable multivibrator 8 is triggered and the dc restored current returned to normal.

Figure 2:
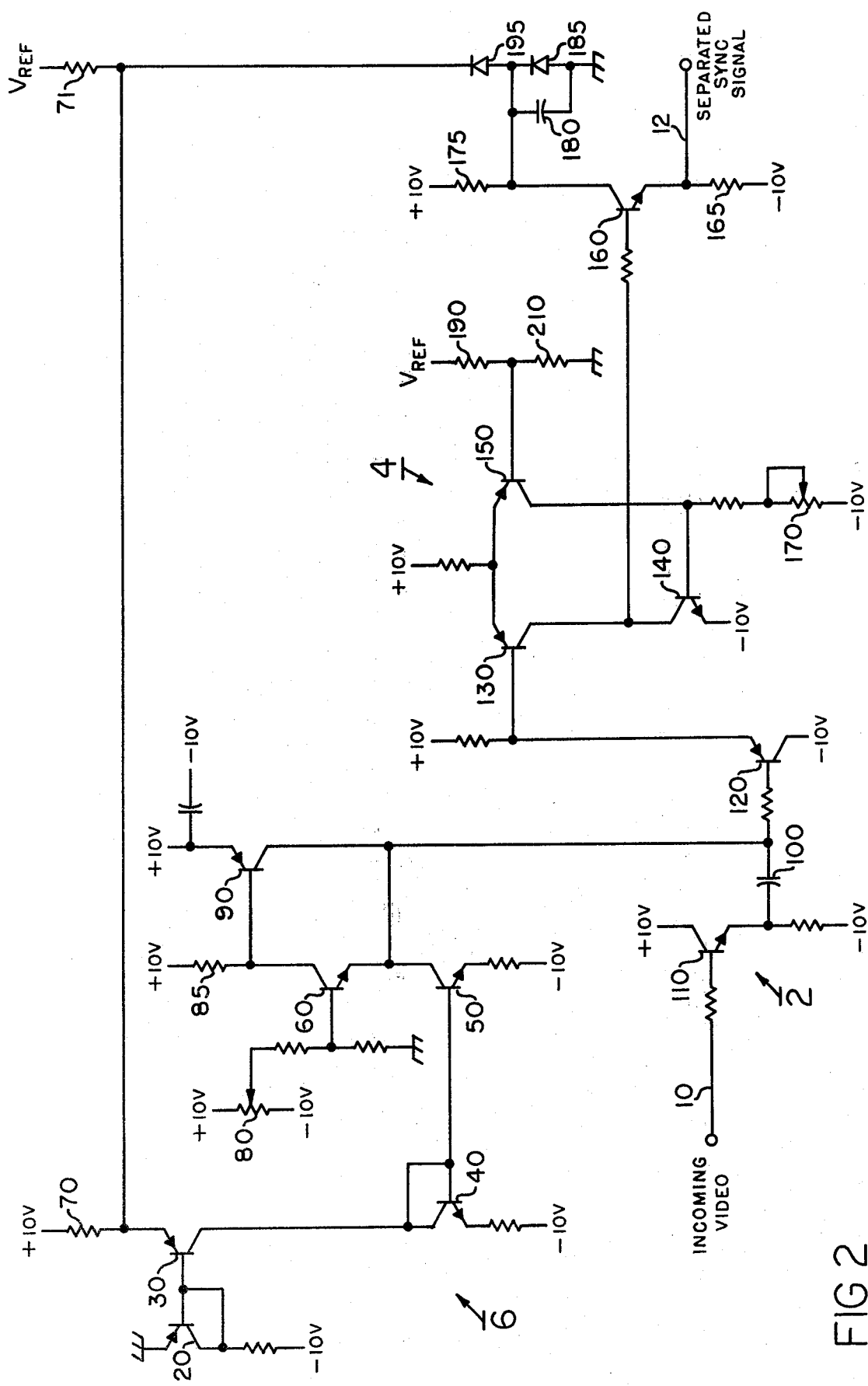
FIG. 2 is a schematic diagram of one embodiment of the present invention.

Shown in FIG. 2 is a schematic representation of a sync separator circuit according to the present invention. Before considering the overall operation of the circuit, provided below are component values that have proven useful in one embodiment of the invention. We do not, however, wish to be limited to this or any other particular set of components.

| | |
|---|---|
| Transistors 20, 30, 40, 50 and 60 | CA3096 |
| Transistors 90, 120, 130 and 150 | MPS6523 |
| Transistors 110, 140 and 160 | MPS6521 |
| Diodes 185 and 195 | 1N4148 |
| Capacitor 100 | 0.047 $\mu f$ |
| Capacitor 180 | 0.022 $\mu f$ |
| Potentiometer 80 | 50 k $\Omega$ |
| Potentiometer 170 | 10 k $\Omega$ |
| Resistor 70 | 1 M $\Omega$ |
| Resistor 71 | 22 k $\Omega$ |
| Resistor 85 | 33 k $\Omega$ |
| Resistor 165 | 470 $\Omega$ |
| Resistor 190 | 680 $\Omega$ |
| Resistor 210 | 510 $\Omega$ |
| Resistor 175 | 62 k $\Omega$ |

The incoming composite video signal enters the circuit on input line 10 and is buffered by emitter follower NPN transistor 110. From the emitter of transistor 110 the video signal is coupled to a dc-restorer circuit comprising NPN transistor 60, PNP transistor 90 and capacitor 100. Transistors 60 and 90 are connected so as to function as an extremely square-cornered clamping diode. During the sync interval of the composite video, a dc restoration voltage is developed across capacitor 100. During the video interval of the composite video signal, a current source 6 provides current to charge capacitor 100 thereby replacing charge removed during the sync interval of the composite video signal. In this embodiment, current source 6 comprises PNP transistor 20, PNP transistor 30, NPN transistor 40, NPN transistor 50 and resistor 70. Transistors 20 and 30 are used as a voltage-level shifter for the conventional current mirror current source of transistors 50 and 60. U.S. Pat. No. 3,939,434 granted to P. S. Crosby, Feb. 17, 1976, which is incorporated herein by reference, discloses an alternate current mirror that may be used. The initial rundown current for capacitor 100 is provided by resistor 70 through the level shifter and current mirror. Additional current is supplied to capacitor 100, through resistor 71, by an external voltage source designated as $V_{REF}$ in FIG. 2. This may be a dc voltage that represents the average amplitude of the sync pulse. This reference voltage causes the rundown current on the signal fed to capacitor 100 to be a constant percentage of the sync pulse amplitude, thus insuring a constant clamping action independent of the sync amplitude over a wide range. The actual dc level of the sync tip may be adjusted over a small range by using potentiometer 80 to compensate for any offset error introduced by amplitude separator 4.

The sync-tip clamped video is buffered by PNP emitter follower transistor 120 and fed to amplitude separator 4. In this embodiment, amplitude separator 4 comprises a pair of differentially coupled PNP transistors (130 and 150) and NPN transistor 140. Initially, the dc voltage at the base of transistor 150 is at ground and potentiometer 80 is set so that the negative tip of the sync pulse just turns on transistor 130. Therefore only the tip of the sync pulse will appear at the collector of transistor 130. After startup, the voltage at the base of transistor 150 will rise to approximately 50 percent of the average amplitude of the sync pulse. This occurs because the previously-mentioned $V_{REF}$ voltage is connected to the base of transistor 150 through the voltage divider of resistors 190 and 210. Placing the base of transistor 150 at this dc voltage, rather than at ground, causes the sync pulse to be picked off the clamped video at the 50-percent level. This is the well known technique of 50-percent sync tracking. NPN transistor 140 has its base connected to the collector of transistor 150 and to a negative voltage supply through potentiometer 170. The emitter of transistor 150 is connected to the same negative voltage supply and the collector thereof is connected to the collector of transistor 130. Potentiometer 170 allows regulation of stored charge removal from transistor 140 and may thereby be used to delay the leading edge of the separated sync pulse at the collector of transistor 140.

The function of retriggerable monostable multivibrator 8 is implemented, in this embodiment, by NPN transistor 160, diodes 185 and 195, capacitor 180 and resistor 175. When impulse noise is not present on the incoming video and the separated sync pulse are present at the collector of transistor 130, transistor 160 performs a buffering function to isolate the sync separator from the next processing stage. During each sync pulse, transistor 160 draws current through resistor 165. This current appears at the collector of transistor 160 and charges capacitor 180 until diode 185 turns on. Between sync pulses, resistor 175 charges capacitor 180 in a positive direction. However, resistor 175 is chosen such that the charge on capacitor 180 will not cross the combined band gap of diode 185 and 195. Each time a sync pulse is passed by transistor 160, capacitor 180 is recharged to the threshold of diode 185.

When a negative noise spike enters the sync separator it is coupled to and causes capacitor 100 to charge to such a low voltage that the sync signal no longer crosses the threshold voltage at which transistor 130 normally turns on. Consequently, there is no sync pulse at the collector of transistor 130 and the base of transistor 160. Without a signal on the base of transistor 160, current from resistor 175 will charge capacitor 180 far enough to turn diode 195 on. Thus, the current from resistor 175 will flow through diode 195 to the emitter of transistor 30 in the level-shifting circuit of current source 6. The current is then mirrored back to dc-restorer circuit 2 where it increases the rundown current to capacitor 100 and thereby decreases the time required for the dc restorer to recover from the negative-going voltage spike. As soon as the dc restorer has recovered and the sync pulse at the base of transistor 130 has once again passed through the threshold voltage thereof, capacitor 180 is discharged by transistor 160. Therefore, the monostable multivibrator function is effectively set and will not time out until another sync pulse is missed.

While we have shown and described a preferred embodiment of our invention, it will be apparent to those skilled in the art that many changes and modifications may be made without departing from our invention in its broader aspects. We therefore intend the appended claims to cover all such changes and modifications.

I claim as my invention:

1. A television synchronizing signal separating circuit comprising:
   a dc restoration circuit for receiving a composite video signal and adding a dc voltage level thereto, the recovery time of said restoration circuit depending upon the amount of current applied thereto;
   a variable current source for supplying current to said dc restoration circuit, the output level of said variable current source varying according to the level of an input pulse applied thereto;
   an amplitude separator coupled to receive a dc-restored video signal from said dc restoration circuit for producing a separated sync signal therefrom; and
   a retriggerable monostable multivibrator having a trigger input terminal for receiving said separated sync signal and an output terminal said output terminal being connected to said variable output current source for applying said input pulse thereto and thereby increasing its output current.

2. The sync separator circuit according to claim 1 wherein said dc restoration circuit comprises a clamping diode and means for storing a dc restoration voltage.

3. The sync separator circuit according to claim 1 wherein said variable output current source comprises a current mirror circuit.

4. The sync separator circuit according to claim 1 wherein said amplitude separator comprises a pair of differentially coupled transistors of the same conductivity type.

5. The sync separator circuit according to claim 4 wherein said differential pair compares the voltage level of said dc restored video signal to a reference voltage approximately equal to fifty percent of the average voltage level of the sync signal.

6. The sync separator circuit according to claim 1 further comprising a buffer amplifier disposed between said dc restoration circuit and said amplitude separator.

* * * * *

UNITED STATES PATENT AND TRADEMARK OFFICE
CERTIFICATE OF CORRECTION

PATENT NO. : 4,254,435  Page 1 of 2

DATED : March 3, 1981

INVENTOR(S) : Birney D. Dayton, William L. Rorden , Leon J. Stanger

It is certified that error appears in the above-identified patent and that said Letters Patent are hereby corrected as shown below:

The complete first page of the specification was omitted, which should read as follows:

--Background of the Invention

This invention relates to noise elimination circuits for use in television synchronizing signal separating circuits.

A composite television signal is composed of a video signal and synchronizing signals such as horizontal synchronizing signals and vertical synchronizing signals. These synchronizing signals are collectively referred to as the sync signal. A sync separator circuit is employed to clip sync signals from the composite television signal. These separated sync signals are then utilized to synchronize horizontal and vertical scanning with the incoming video information.

The composite television signal is susceptible to various types of interference and noise. Several circuits have been developed to either reduce or eliminate noise in television signals. For example, U.S. Patent No. 4,081,833 describes a sync separator which contains circuitry to eliminate distortion caused by hum. Another type of noise that is of concern is impulse noise. Among other problems, impulse noise produces black dots of very low visibility in the picture and spikes exceeding the normal level of the sync pulse in the sync signal. These spikes prevent the sync separator from operating correctly; therefore, once the impulse noise ceases a means is required to speed the recovery of the sync separator to normal operation.

--CONTINUED--

UNITED STATES PATENT AND TRADEMARK OFFICE
CERTIFICATE OF CORRECTION

PATENT NO. : 4,254,435                 Page 2 of 2

DATED : March 3, 1981

INVENTOR(S) : Birney D. Dayton, William L. Rorden, Leon J. Stanger

It is certified that error appears in the above-identified patent and that said Letters Patent are hereby corrected as shown below:

Summary of the Invention

The present invention alleviates problems in sync separating circuits which are caused by large negative-going voltage spikes on the input composite video signal. A retriggerable monostable multivibrator normally retriggered by separated sync times out when a negative-going voltage spike causes a sync separator to miss a sync pulse. The output from the monostable multivibrator is coupled to a variable current source which supplies current to the dc-restorer circuit of the sync separator. When the monostable multivibrator times out, it increases the current to the dc restorer and thus speeds up recovery from the noise spike.--

Col. 2, line 1, reads "cicruit" should be --circuit--

Signed and Sealed this

Twenty-first Day of July 1981

[SEAL]

Attest:

GERALD J. MOSSINGHOFF

Attesting Officer      Commissioner of Patents and Trademarks